United States Patent
Stewart et al.

(10) Patent No.: US 9,223,301 B2
(45) Date of Patent: Dec. 29, 2015

(54) ACTIVE CLOUD POINT CONTROLLER FOR REFINING APPLICATIONS AND RELATED METHOD

(75) Inventors: Gregory E. Stewart, North Vancouver (CA); Jeffry T. Donner, Aurora, IL (US); Sebastien Tixier, North Vancouver (CA); Frank M. Haran, North Vancouver (CA); Charles P. Luebke, Mount Prospect, IL (US)

(73) Assignee: Honeywell International Inc., Morris Plains, NJ (US)

( * ) Notice: Subject to any disclaimer, the term of this patent is extended or adjusted under 35 U.S.C. 154(b) by 896 days.

(21) Appl. No.: 12/763,015

(22) Filed: Apr. 19, 2010

(65) Prior Publication Data

US 2011/0257789 A1 Oct. 20, 2011

(51) Int. Cl.
*G05B 21/00* (2006.01)
*G05B 13/04* (2006.01)

(52) U.S. Cl.
CPC .................................. *G05B 13/048* (2013.01)

(58) Field of Classification Search
CPC ... G01N 33/2811; Y02E 50/13; G05B 13/048
USPC ........ 700/266, 270, 271; 800/295; 435/289.1; 44/269, 307
See application file for complete search history.

(56) References Cited

U.S. PATENT DOCUMENTS

| | | | |
|---|---|---|---|
| 5,082,956 A | 1/1992 | Monnier et al. | |
| 5,510,306 A | 4/1996 | Murray | |
| 5,741,759 A | 4/1998 | Gee et al. | |
| 6,072,576 A * | 6/2000 | McDonald et al. | ........... 356/300 |
| 2004/0065003 A1 | 4/2004 | O'Rear | |
| 2005/0053116 A1 | 3/2005 | Tsang et al. | |
| 2005/0205462 A1* | 9/2005 | Gopalakrishnan et al. | ..... 208/78 |
| 2007/0135669 A1* | 6/2007 | Koivusalmi et al. | .......... 585/331 |
| 2008/0163543 A1* | 7/2008 | Abhari et al. | .................... 44/308 |
| 2009/0199462 A1 | 8/2009 | Bist et al. | |
| 2009/0287029 A1 | 11/2009 | Anumakonda et al. | |
| 2009/0301930 A1 | 12/2009 | Brandvold et al. | |
| 2010/0014554 A1* | 1/2010 | Albertson | ........................ 374/16 |
| 2010/0043279 A1 | 2/2010 | Abhari et al. | |
| 2010/0083563 A1* | 4/2010 | Miller | .............................. 44/308 |

OTHER PUBLICATIONS

"UOP/ENI Ecofining Process, Renewable Energy and Chemicals", UOP LLC, 2008, 2 pages.

(Continued)

*Primary Examiner* — Shogo Sasaki

(57) ABSTRACT

A method includes receiving a measurement associated with a cloud point of a biofuel being produced in a refining system. The method also includes determining how to adjust the refining system based on a desired cloud point of the biofuel and the measurement associated with the cloud point. The method further includes outputting a control signal to adjust the refining system based on the determination. Determining how to adjust the refining system could include determining how to adjust an inlet temperature of a reactor in the refining system. The reactor could represent an isomerization reactor, and a heater could heat material entering the isomerization reactor. Determining how to adjust the inlet temperature of the reactor could include determining how to adjust operation of the heater. A model predictive control (MPC) technique could be used to determine how to adjust the inlet temperature of the isomerization reactor.

21 Claims, 2 Drawing Sheets

(56) References Cited

OTHER PUBLICATIONS

Tom Kalnes, et al., "Biorenewable Diesel; A Green Alternative", 2008, UOP LLC, 11 pages.
"Measures the Cloud Point of Petroleum Products", ATAC, Analytical Technology & Control Limited, Jun. 2004, 2 pages.
"Model P-820 Cloud Point Analyzer", ORB Instruments, Inc., Jan. 2010, 4 pages.
Notification of Transmittal of the International Search Report and the Written Opinion of the International Searching Authority, or the Declaration dated Nov. 14, 2011 in connection with International Patent Application No. PCT/US2011/031188.
European Search Report dated Apr. 11, 2014 in connection with European Application No. 11772417.9, 3 pages.
European Examination Report dated May 13, 2014 in connection with European Application No. 11772417.9, 3 pages.

* cited by examiner

ACTIVE CLOUD POINT CONTROLLER FOR REFINING APPLICATIONS AND RELATED METHOD

TECHNICAL FIELD

This disclosure relates generally to the control of refining applications. More specifically, this disclosure relates to an active cloud point controller for refining applications and related method.

BACKGROUND

The use of biofuels is becoming more and more popular in the United States and around the world. Biofuels generally represent fuels manufactured using organic biomass, such as vegetable oils, organic fats, and organic greases. This is opposed to petrochemical-based fuels, which are manufactured using crude oil or other petrochemicals.

Biofuels and petrochemical-based fuels typically have associated "cloud points." The cloud point of a fuel denotes the temperature at which haze begins to appear in the fuel. This haze is caused by solidified wax particles forming within the fuel as the temperature of the fuel falls below some threshold point. Obviously, it is desirable to use a fuel at a temperature above its cloud point. If a fuel is used at a temperature below its cloud point, the particles that form in the fuel can clog an engine or cause other problems.

SUMMARY

This disclosure provides an active cloud point controller for refining applications and related method.

In a first embodiment, a method includes receiving a measurement associated with a cloud point of a biofuel being produced in a refining system. The method also includes determining how to adjust the refining system based on a desired cloud point of the biofuel and the measurement associated with the cloud point. The method further includes outputting a control signal to adjust the refining system based on the determination.

In a second embodiment, an apparatus includes at least one interface configured to receive a measurement associated with a cloud point of a biofuel produced in a refining system. The apparatus also includes at least one processing unit configured to determine how to adjust the refining system and to output a control signal via the at least one interface to adjust the refining system based on the determination. The at least one processing unit is configured to determine how to adjust the refining system based on a desired cloud point of the biofuel and the measurement associated with the cloud point.

In a third embodiment, a computer readable medium embodies a computer program. The computer program includes computer readable program code for receiving a measurement associated with a cloud point of a biofuel produced in a refining system. The computer program also includes computer readable program code for determining how to adjust the refining system based on the measurement associated with the cloud point. The computer program further includes computer readable program code for initiating communication of a control signal to adjust the refining system based on the determination.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
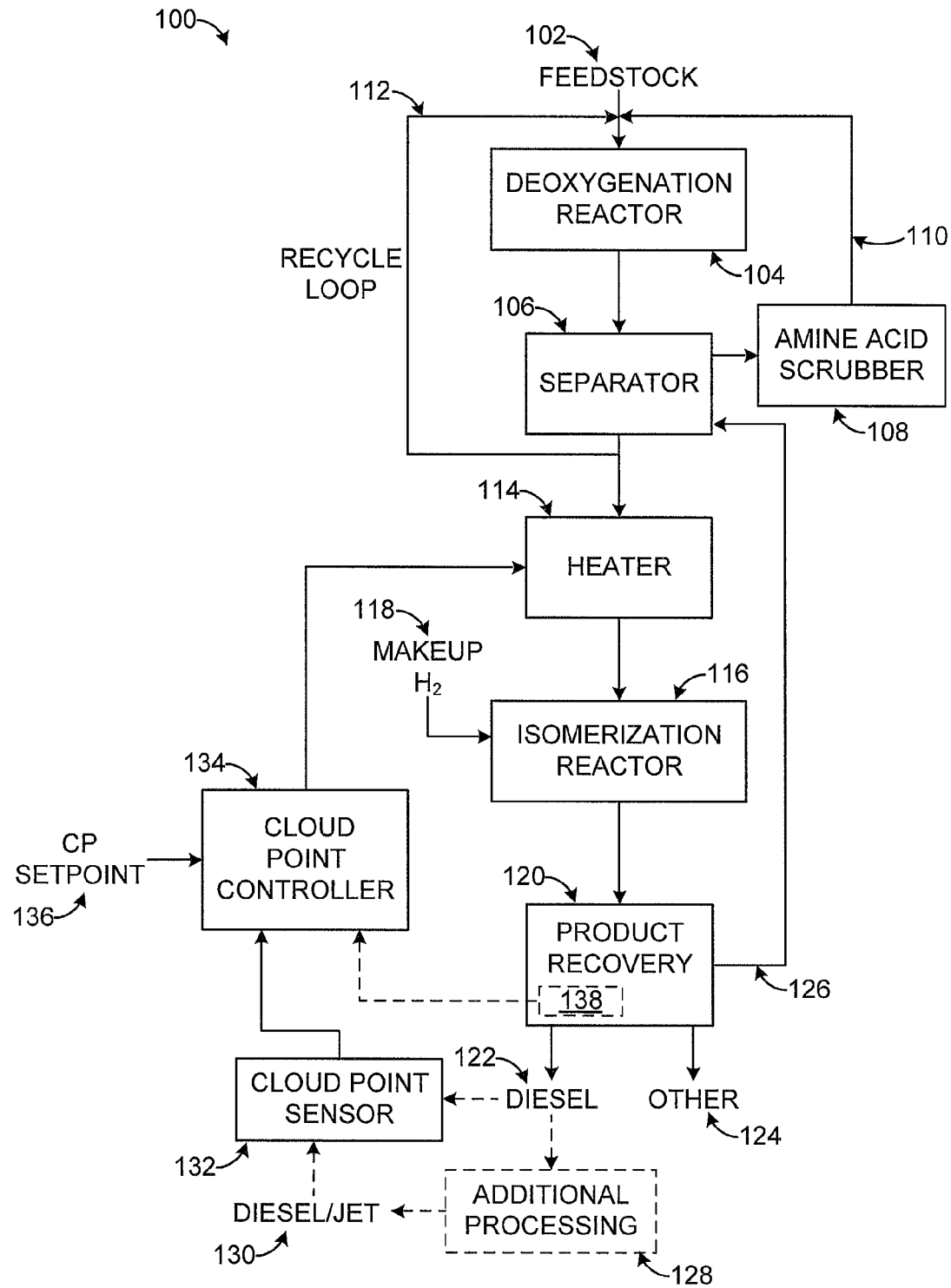
FIG. 1 illustrates an example refining system with active cloud point control according to this disclosure.
Figure 2:
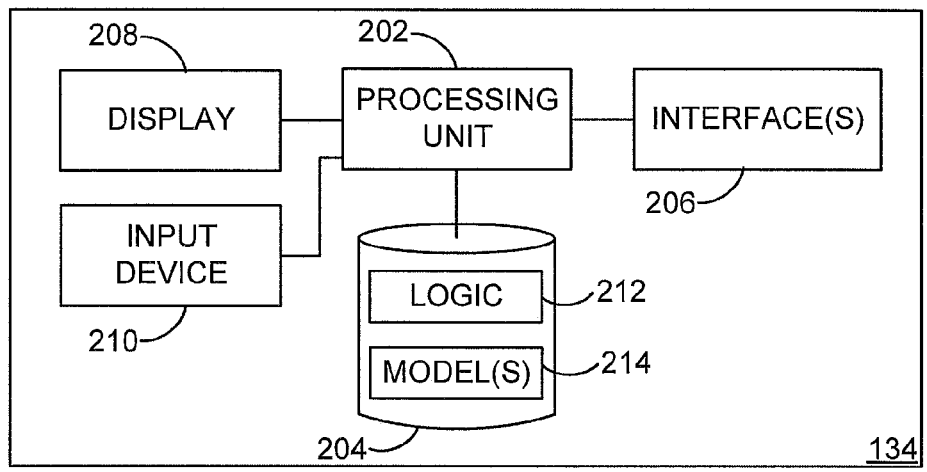
FIG. 2 illustrates an example active cloud point controller according to this disclosure.
Figure 3:
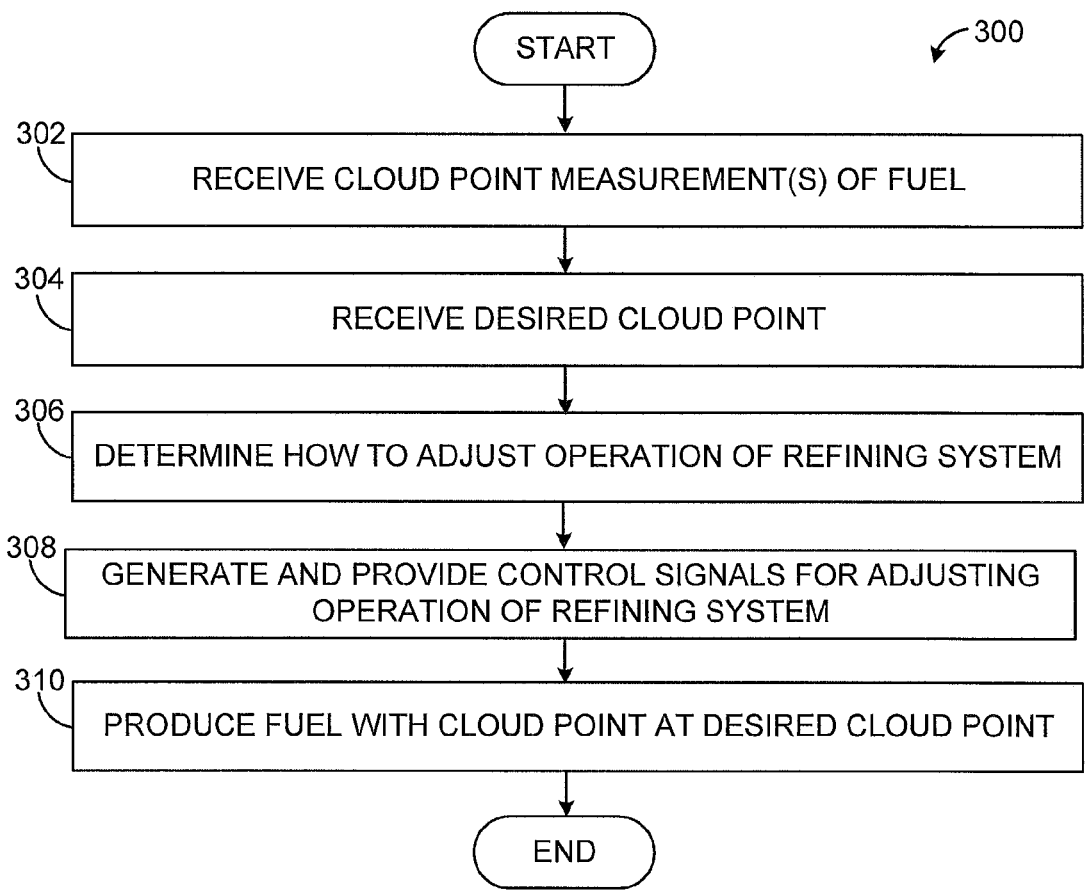
FIG. 3 illustrates an example method for active cloud point control in a refining system according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example refining system 100 with active cloud point control according to this disclosure. The embodiment of the refining system 100 shown in FIG. 1 is for illustration only. Other embodiments of the refining system 100 could be used without departing from the scope of this disclosure.

As shown in FIG. 1, the refining system 100 receives a feedstock 102, which generally represents organic biomass. The feedstock 102 could include a wide range of materials. For example, the feedstock 102 could include one or more vegetable oils, such as soybean, rapeseed, canola, soybean, and palm oils. The feedstock 102 could also include animal fats or greases, such as tallow oil and waste greases. The feedstock 102 could further include algal and jatropha oils. Note that the rate at which the feedstock 102 is received (the "feed rate") and the makeup of the feedstock 102 (the "composition") can vary over time. The feedstock 102 could be provided by any suitable source, such as a low-pressure feed surge drum with an associated pump.

In this example, the feedstock 102 is mixed with other materials (described below) and can be heated. The mixed feedstock 102 is then provided to a deoxygenation reactor 104. The deoxygenation reactor 104 deoxygenates the feedstock 102 to generate straight-chain paraffins. In some embodiments, the by-products of the deoxygenation reaction include propane, water, and carbon dioxide ($CO_2$). The deoxygenation reactor 104 includes any suitable structure for deoxygenating feedstock material, such as a multi-stage, adiabatic, catalytic hydro-deoxygenation reactor. The selectivity of the deoxygenation reaction to diesel boiling-range paraffin can be very high. In particular embodiments, the deoxygenation reactor 104 can use the ULTRAMIX distribution system from UOP LLC. The deoxygenation reactor 104 could also have a catalyst bed using any suitable catalyst for the reaction. Deoxygenation catalysts can include any of those well known in the art or developed later, such as nickel or nickel/molybdenum dispersed on a high surface area support such as alumina. Hydrogen sulfide ($H_2S$) can be used to help maintain the stability of the catalyst. The hydrogen sulfide could be obtained in any suitable manner, such as by dosing with sulfur obtained using dimethyl disulphide, recycling hydrogen sulfide from other process units, or adding purified disulphide oil.

The by-products generated by the deoxygenation reactor 104 are provided to a separator 106 (possibly after cooling). The separator 106 separates various by-products, such as by separating carbon dioxide, water, and low molecular weight hydrocarbons from heavier hydrocarbons. The separator 106 includes any suitable structure for separating heavier hydrocarbons from one or more other materials, such as an enhanced hot separator (EHS) using fresh hydrogen for stripping.

Gases from the separator 106 can be provided to an amine acid scrubber 108. The scrubber 108 can separate various materials (such as carbon dioxide, carbon monoxide, and hydrogen sulfide) from hydrogen gas. The hydrogen gas can be output as a hydrogen stream 110, while the other materials can be output for discharge or further processing. The hydrogen stream 110 can be mixed with the feedstock 102 before being provided to the deoxygenation reactor 104. The flow of hydrogen could be set to achieve a minimum hydrogen partial pressure at the outlet of the reactor 104. The amine acid scrubber 108 includes any suitable structure for recycling hydrogen through the removal of acid gases using an alkanolamine.

A portion of the heavier hydrocarbons from the separator 106 can be provided to a recycle loop 112. The recycle loop 112 provides this portion of the heavier hydrocarbons back to the deoxygenation reactor 104 (after mixing with the feedstock 102) for quenching purposes. This allows the heavier hydrocarbons to act as liquid heat redistributors. The ratio of the amount of recycled material to the amount of fresh feedstock 102 entering the reactor 104 can vary widely but is usually between about 2:1 to about 8:1, which allows feed rate flexibility while maintaining a correct flux over the catalyst bed of the deoxygenation reactor 104.

Another portion of the heavier hydrocarbons from the separator 106 can be heated by a heater 114 before entering an isomerization reactor 116. This portion of the heavier hydrocarbons could also be mixed with additional hydrogen gas at some point, possibly before entering the isomerization reactor 116. The heater 114 includes any suitable structure for heating material, such as a fired heater that is operated using natural gas or other gaseous fuel.

The isomerization reactor 116 can isomerize paraffins or other diesel hydrocarbons to generate branched-chain paraffins. The isomerization reactor 116 includes any suitable structure for performing isomerization reactions, such as an integrated catalytic hydro-isomerization reactor. The isomerization reactor 116 could also have a catalyst bed using any suitable catalyst for the reaction. Suitable catalysts can include a metal of Group VIII (IUPAC 8-10) of the periodic table and a support material. Suitable Group VIII metals include platinum and palladium, each of which may be used alone or in combination. The support material may be amorphous or crystalline. Suitable support materials include amorphous alumina, amorphous silica-alumina, and molecular sieves. Further catalysts and conditions for skeletal isomerization are disclosed in U.S. Pat. No. 5,510,306; U.S. Pat. No. 5,082,956; and U.S. Pat. No. 5,741,759. The isomerization reaction can be selective and consume very little hydrogen. If necessary, however, makeup hydrogen 118 can be added to the process to balance both chemical consumption and solution losses in the system 100. The makeup hydrogen 118 can be provided from any suitable source.

The isomerized material from the isomerization reactor 116 is provided to a product recovery unit 120. The product recovery unit 120 processes the isomerized material to recover various products. These products can include green diesel fuel 122, other fuel products 124 (such as propane and naphtha), and gaseous material 126. The product recovery unit 120 includes any suitable structure(s) for performing operations to recover diesel fuel and other products from isomerized material. In some embodiments, the product recovery unit 120 includes a cold separator that separates liquid hydrocarbons, water, and gaseous material. The water can be output for discharge or further processing. The gaseous material 126 can be passed from the cold separator to the separator 106 for further processing. The product recovery unit 120 can also include a product stripper that receives the liquid hydrocarbons from the cold separator and separates the liquid hydrocarbons into the green diesel fuel 122 and other fuel products 124. The other fuel products 124 could be concentrated into a liquid stream and further processed (such as by using a debutanizer) to generate green gasoline or liquefied petroleum gas (LPG). Also, at least a portion of light fuel co-products can be steam reformed or otherwise processed to generate some or all of the hydrogen consumed in the refining system 100.

Depending on the implementation, the diesel fuel 122 could be output for transport and use. The diesel fuel 122 could also be processed in an additional processing unit 128 to generate green diesel and green jet fuels 130. The additional processing unit 128 includes any suitable structure(s) for converting diesel fuel into jet fuel.

As noted above, various types of fuels (such as the diesel fuels 122, 130) have associated cloud points. The cloud point of a fuel 122, 130 often needs to vary based on, for example, a particular order that is being fulfilled by an operator of the refining system 100. These orders usually change over time, such as when fuels with lower cloud points are ordered during winter and fuels with higher cloud points are ordered during summer. As a result, the refining system 100 needs to be periodically adjusted in order to generate one or more fuels 122, 130 with suitable cloud point(s). The cloud point of a fuel 122, 130 is affected by the severity of the isomerization reaction in the reactor 116. Higher processing severity often results in a lower cloud point, but this causes a yield shift from diesel fuel to lower molecular weight fuels. In other words, it is possible to lower the cloud point of a fuel 122, 130 based on the severity of the isomerization reaction, but doing so reduces the amount of the fuel that is generated.

In FIG. 1, the refining system 100 uses active cloud point control in order to cause at least one fuel 122, 130 to have a cloud point at or below a desired cloud point. In this example, active cloud point control involves the use of a cloud point sensor 132 and a cloud point controller 134. The cloud point sensor 132 measures a cloud point of the fuel 122, 130. The cloud point sensor 132 includes any suitable structure for sensing or measuring (either directly or indirectly) the cloud point of a fuel. For example, an inferential cloud point sensor 132 could make inferred measurements of the cloud point of a fuel based on other characteristic(s) of the fuel. The cloud point sensor 132 could represent an online sensor that takes continuous or intermittent measurements of the cloud point of a fuel. In particular embodiments, the cloud point sensor 132 represents a continuous, online, real-time cloud point sensor having an accuracy and bandwidth suitable for use with the isomerization reactor 116.

The cloud point controller 134 controls at least a portion of the refining system 100 in order to adjust and control the cloud point of the fuel 122, 130 being generated. The controller 134 generally operates by receiving measurements of at least one controlled variable (and possibly at least one disturbance variable) and generating control signals to modify at least one manipulated variable. A "controlled variable" represents a variable that is measured and that the controller 134 typically attempts to maintain at or near a desired value or within a desired range. A "manipulated variable" represents a variable that the controller 134 can manipulate or change, which is often done in order to modify at least one controlled variable. A "disturbance variable" represents a variable that affects a controlled variable, where the disturbance variable can be considered by the controller 134 but generally cannot be controlled by the controller 134.

In this example, one controlled variable could be the cloud point of the fuel 122, 130. The controller 134 generally controls at least part of the refining system 100 so that the cloud point of the fuel 122, 130 is at or below a cloud point (CP) setpoint 136. The setpoint 136 could change as the refining system 100 is used to produce fuel to satisfy different orders. One manipulated variable could be the inlet temperature of the isomerization reactor 116. The controller 134 can adjust the operation of the heater 114 to adjust the temperature of the material entering the isomerization reactor 116, thereby altering the inlet temperature of the reactor 116. The heater 114 therefore acts as an actuator that is used by the controller 134 to adjust a manipulated variable. Two disturbance variables could be the feed rate and the composition of the feedstock 102. For instance, the feed rate of the feedstock 102 could vary (such as between 2,000 and 7,150 barrels per day), and the exact composition of the biomass in the feedstock 102 could vary widely over time. These variables could alter the cloud point of the fuel 122, 130 but might not be controllable by the controller 134.

In particular embodiments, the cloud point of the fuel 122, 130 could vary between approximately −40° C. and approximately +20° C. Also, the inlet temperature of the isomerization reactor 116 could vary in a range between approximately 400° F. and approximately 700° F. Based on the measurements of the cloud point by the sensor 132, the controller 134 can adjust the heating provided by the heater 114 in order to alter the cloud point of the fuel 122, 130. Ideally, the controller 134 adjusts the inlet temperature of the isomerization reactor 116 so that the desired cloud point is obtained while maximizing production of the fuel 122, 130.

The logic used by the controller 134 could represent any suitable control logic and be implemented in any suitable manner. For example, in some embodiments, the controller 134 represents a model predictive control (MPC) controller that uses one or more models to predict how changes to one or more manipulated variables affect one or more controlled variables. The MPC controller can then use actual measurements of the one or more controlled variables (and possibly one or more disturbance variables) to determine how to adjust the one or more manipulated variables. The model(s) can be generated in any suitable manner, such as by step-testing or using historical data. Any other suitable type of control logic could also be used, such as proportional-integral-derivative (PID) control logic.

Note that other variables could also be used by the controller 134. For example, one or more sensors 138 in the product recovery unit 120 could be used to measure the temperature or other characteristic(s) of material exiting the isomerization reactor 116 or in the product recovery unit 120. As particular examples, a first sensor 138 could measure one or more characteristics of isomerized material entering a cold separator, and a second sensor 138 could measure one or more characteristics of liquid hydrocarbons entering a product stripper. These or other variables could also be used as controlled variables. Moreover, the control logic of the controller 134 could utilize linear program (LP) optimization, quadratic program (QP) optimization, or other mechanisms to optimize various criteria. For instance, the control logic could operate to maintain the cloud point of the fuel 122, 130 at the setpoint 136 while minimizing hydrogen use in the refining system 100.

The controller 134 includes any suitable structure for controlling at least a portion of a refining process in order to control a cloud point of a fuel. For example, the controller 134 could include at least one processing unit and at least one memory storing instructions and data used, generated, or collected by the processing unit(s). The controller 134 could also include at least one interface facilitating communication with the controller 134. The interface(s) could, for example, facilitate the receipt of measurements from the sensor(s) 132, 138 and the transmission of control signals to the heater 114. However, other suitable structures (such as dedicated hardware components) could be used to implement the control logic or other functions of the controller 134.

By using active cloud point control in this way, the controller 134 can be used to push the cloud point of the fuel 122, 130 to a desired setpoint. Since the yield of the fuel increases as the cloud point increases, the active cloud point control can help to increase or maximize yield of a fuel while satisfying a particular order for that fuel. This can result in significant economic benefit to the operator of the refining system 100.

Although FIG. 1 illustrates one example of a refining system 100 with active cloud point control, various changes may be made to FIG. 1. For example, FIG. 1 illustrates one example refining system that can be used with active cloud point control. More specifically, FIG. 1 illustrates example details of the ECOFINING process from UOP LLC, although the system 100 has been simplified for ease of illustration and explanation. Active cloud point control can be used with any other suitable refining system. Also, additional details regarding the refining system 100 are well-known in the art and are not needed for an understanding of the active cloud point control. Further, components could be added, moved, further subdivided, or omitted according to particular needs. For instance, a heat exchanger could be inserted between the deoxygenation reactor 104 and the heater 114 in order to recover heat from an output of the isomerization reactor 116. In addition, while FIG. 1 has illustrated the use of specific variables (actual cloud point of a fuel, isomerization reactor inlet temperature, and feedstock composition and feed rate), other or additional controlled, manipulated, and/or disturbance variables could be used. For instance, a ratio of the isomerized material to normal material exiting the reactor 116 could be used as a controlled variable. Other variables could include a pressure inside the reactor 104, a pressure inside the reactor 116, and/or a partial hydrogen pressure at one or more locations.

FIG. 2 illustrates an example active cloud point controller 134 according to this disclosure. The embodiment of the cloud point controller 134 shown in FIG. 2 is for illustration only. Other embodiments of the cloud point controller 134 could be used without departing from the scope of this disclosure. Also, for ease of explanation, the cloud point controller 134 is described as being used in the refining system 100 of FIG. 1. The cloud point controller 134 could be used in any other suitable facility or system.

In this example embodiment, the cloud point controller 134 includes a processing unit 202, a memory 204, at least one interface 206, a display 208, and an input device 210. The processing unit 202 represents any suitable processing device, such as a microprocessor, microcontroller, digital signal processor, application-specific integrated circuit, field programmable gate array, or other logic device. The memory 204 represents any suitable volatile and/or non-volatile storage and retrieval device or devices, such as RAM, ROM, or Flash memory. The interface 206 represents any suitable structure for facilitating communication with external devices, such as sensors and actuators. As particular examples, the interface 206 can include any suitable structure for receiving cloud point sensor measurements and transmitting heating control signals. The display 208 represents any suitable structure for presenting information to a user. The input device 210 represents any suitable structure(s) for providing input to the processing unit 202 from a user, such as a keyboard or mouse.

In this example, the memory 204 includes control logic 212 and one or more models 214. The control logic 212 represents computer instructions or other logic defining how the cloud point controller 134 controls the cloud point of fuel in the refining system 100. For example, the control logic 212 could use the models 214 to analyze input data (such as cloud point measurements) to generate output signals (such as control signals for adjusting the isomerization reactor inlet temperature).

The one or more models 214 define relationships between (i) manipulated and disturbance variables and (ii) controlled variables. The models 214 are used by the cloud point controller 134 to control the cloud point of fuel being produced. In particular embodiments, each model 214 could associate a single manipulated or disturbance variable to a single controlled variable.

The models 214 can be constructed in any suitable manner. The models 214 could be generated, for example, based on step-test data involving the system 100. As part of the control of the cloud point of fuel in the system 100, the controller 134 could use the models 214 to make adjustments to manipulated variables so that controlled variables are maintained within specified limits.

The controller 134 can optimize the operation of the refining system 100 using these models 214 and one or more optimization approaches. In some embodiments, the controller 134 is configured to use either linear program (LP) optimization or quadratic program (QP) optimization when controlling the system 100. These two optimization approaches use a simple minimization strategy, although the quadratic optimization also uses ideal resting values (or desired steady state values). The optimization can be defined to meet various objectives. These objectives could include maximizing diesel/jet fuel production subject to constraints and minimizing hydrogen usage. In particular embodiments, the general form of an objective function could be:
Minimize $$J = \sum_i a_i \times (CV_i - e_i) + \sum_i b_i^2 (CV_i - f_i)^2 + \sum_j c_j \times (MV_j - g_j) + \sum_j d_j^2 (MV_j - h_j)^2$$

where:
$a_i$ represents the linear coefficient of the $i^{th}$ controlled variable;
$b_i$ represents the quadratic coefficient of the $i^{th}$ controlled variable;
$c_j$ represents the linear coefficient of the $j^{th}$ manipulated variable;
$d_j$ represents the quadratic coefficient of the $j^{th}$ manipulated variable;
$e_i$ represents the desired resting value of the $i^{th}$ controlled variable in the linear term (typically 0 or $CV_{0i}$);
$f_i$ represents the desired resting value of the $i^{th}$ controlled variable in the quadratic term (typically 0 or $CV_{0i}$);
$g_j$ represents the desired resting value of the $j^{th}$ manipulated variable in the linear term (typically 0 or $MV_{0j}$);
$h_j$ represents the desired resting value of the $j^{th}$ manipulated variable in the quadratic term (typically 0 or $MV_{0j}$);
$CV_i$ represents the actual value of the $i^{th}$ controlled variable; and
$MV_j$ represents the actual value of the $j^{th}$ manipulated variable.

The controller 134 can optimize the controlled variables using this optimization to meet various ones of the objectives described above.

Although FIG. 2 illustrates one example of an active cloud point controller 134, various changes may be made to FIG. 2. For example, the controller 134 could include any other or additional components according to particular needs. Also, while shown as being formed using a computer processing device, the controller 134 could be implemented in any other suitable manner. In addition, while the controller 134 shown here represents an MPC controller, the cloud point controller 134 could implement any other suitable control technique (such as PID control).

FIG. 3 illustrates an example method 300 for active cloud point control in a refining system according to this disclosure. The embodiment of the method 300 shown in FIG. 3 is for illustration only. Other embodiments of the method 300 could be used without departing from the scope of this disclosure. Also, for ease of explanation, the method 300 is described with respect to the cloud point controller 134 operating in the refining system 100 of FIG. 1. The method 300 could be used by any device or system to control any suitable refining system or portion thereof.

One or more cloud point measurements of a fuel being produced in a refining system are received at step 302. This could include, for example, the cloud point controller 134 receiving data identifying the measured or inferred cloud point of a fuel 122, 130 from a cloud point sensor 132. The controller receives a desired cloud point associated with the fuel at step 304. This could include, for example, the cloud point controller 134 receiving the current setpoint 136 for the fuel.

The controller determines how to adjust the operation of the refining system at step 306. This could include, for example, the cloud point controller 134 using the cloud point measurements and one or more models 214 to determine how to adjust the inlet temperature of the isomerization reactor 116 to move the current cloud point towards the desired cloud point. If the current cloud point is already at the desired cloud point, this could include the cloud point controller 134 determining how to keep the current cloud point at the desired cloud point.

The controller generates and provides one or more control signals for adjusting operation of the refining system at step 308. This may include, for example, the cloud point controller 134 generating control signals to adjust operation of the heater 114, thereby altering the inlet temperature of the isomerization reactor 116. Ideally, these control signals cause the refining system to produce fuel having a cloud point at (or at least below) the desired cloud point at step 310. In this way, the cloud point controller can help to produce fuel with a suitable cloud point while increasing or maximizing fuel production, decreasing or minimizing hydrogen usage, and/or satisfying other operating objectives.

Although FIG. 3 illustrates one example of a method 300 for active cloud point control in a refining system, various changes may be made to FIG. 3. For example, while shown as a series of steps, various steps in FIG. 3 could overlap, occur in parallel, or occur in a different order. Also, various steps in FIG. 3 could be repeated, such as when the controller 134 performs steps 302-308 at a specified interval while step 310 is performed substantially continuously.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a first measurement associated with a cloud point of a biofuel being produced in a refining system;
   receiving at least one second measurement associated with a byproduct being produced in a reactor of the refining system, wherein the at least one second measurement is taken after the byproduct is produced in the reactor;
   determining, using at least one processing device, how to adjust an inlet temperature of the reactor in the refining system based on the first measurement associated with the cloud point and the at least one second measurement associated with the byproduct to achieve a desired cloud point and output of the biofuel; and
   outputting a control signal to adjust the inlet temperature of the reactor based on the determination.

2. The method of claim 1, wherein:
   the reactor comprises an isomerization reactor; and
   determining how to adjust the inlet temperature of the reactor comprises determining how to adjust an inlet temperature of the isomerization reactor.

3. The method of claim 2, wherein:
   a heater heats material entering the isomerization reactor; and
   determining how to adjust the inlet temperature of the isomerization reactor comprises determining how to adjust operation of the heater.

4. The method of claim 2, wherein determining how to adjust the inlet temperature of the isomerization reactor comprises using a model predictive control (MPC) technique.

5. The method of claim 1, wherein receiving the at least one second measurement associated with the byproduct comprises receiving the at least one second measurement from at least one sensor associated with a product recovery unit that recovers one or more fuel products.

6. The method of claim 5, wherein receiving the at least one second measurement from the at least one sensor comprises receiving a measurement from a first sensor associated with a cold separator and a measurement from a second sensor associated with a product stripper.

7. An apparatus comprising:
   at least one interface configured to receive (i) a first measurement associated with a cloud point of a biofuel being produced in a refining system and (ii) at least one second measurement associated with a byproduct being produced in a reactor of the refining system, wherein the at least one second measurement comprises data taken after the byproduct is produced in the reactor; and
   at least one processing unit configured to:
      determine how to adjust an inlet temperature of the reactor in the refining system based on the first measurement associated with the cloud point and the at least one second measurement associated with the byproduct to achieve a desired cloud point and output of the biofuel; and
      output a control signal via the at least one interface to adjust the inlet temperature of the reactor based on the determination.

8. The apparatus of claim 7, wherein:
   the reactor comprises an isomerization reactor; and
   the at least one processing unit is configured to determine how to adjust the inlet temperature of the reactor by determining how to adjust an inlet temperature of the isomerization reactor.

9. The apparatus of claim 8, wherein the at least one processing unit is configured to determine how to adjust the inlet temperature of the isomerization reactor by determining how to adjust operation of a heater that is configured to heat material entering the isomerization reactor.

10. The apparatus of claim 7, wherein:
    the at least one processing unit is further configured to receive the at least one second measurement from at least one sensor associated with a product recovery unit in the refining system that recovers one or more fuel products; and
    the at least one processing unit is configured to determine how to adjust the inlet temperature of the reactor based on the at least one second measurement from the at least one sensor.

11. The apparatus of claim 7, wherein the at least one processing unit is configured to execute control logic for determining how to adjust the inlet temperature of the reactor in the refining system.

12. The apparatus of claim 11, wherein the apparatus is configured to determine how to adjust the inlet temperature of the reactor using a model predictive control (MPC) technique and further comprises a memory configured to store at least one model associated with the cloud point of the biofuel.

13. The apparatus of claim 12, wherein the at least one processing unit is configured to determine how to adjust the inlet temperature of the reactor in order to at least one of: maximize biofuel production and minimize hydrogen usage in the refining system.

14. A non-transitory computer readable medium embodying a computer program, the computer program comprising computer readable program code for:
- receiving a first measurement associated with a cloud point of a biofuel being produced in a refining system;
- receiving at least one second measurement associated with a byproduct being produced in a reactor of the refining system, wherein the at least one second measurement comprises data taken after the byproduct is produced in the reactor;
- determining how to adjust an inlet temperature of the reactor in the refining system based on the first measurement associated with the cloud point and the at least one second measurement associated with the byproduct to achieve a desired cloud point and output of the biofuel; and
- outputting a control signal to adjust the inlet temperature of the reactor based on the determination.

15. The computer readable medium of claim 14, wherein:
the reactor comprises an isomerization reactor; and
the computer readable program code for determining how to adjust the inlet temperature of the reactor comprises computer readable program code for determining how to adjust an inlet temperature of the isomerization reactor.

16. The computer readable medium of claim 15, wherein the computer readable program code for determining how to adjust the inlet temperature of the isomerization reactor comprises computer readable program code for determining how to adjust operation of a heater that is configured to heat material entering the isomerization reactor.

17. The computer readable medium of claim 14, wherein the computer readable program code for determining how to adjust the refining system comprises computer readable program code for determining how to adjust the inlet temperature of the reactor in the refining system using a model predictive control (MPC) technique.

18. The method of claim 1, wherein receiving the first measurement comprises receiving a real-time measurement of the cloud point of the biofuel from an online cloud point sensor within the refining system.

19. The apparatus of claim 7, wherein the at least one interface is configured to receive a real-time measurement of the cloud point of the biofuel from an online cloud point sensor within the refining system.

20. The computer readable medium of claim 14, wherein the computer readable program code for receiving the first measurement comprises computer readable program code for receiving a real-time measurement of the cloud point of the biofuel from an online cloud point sensor within the refining system.

21. The method of claim 1, wherein determining how to adjust the inlet temperature of the reactor comprises determining how to adjust operation of a heater that heats material entering the reactor in order to obtain a desired cloud point of the biofuel while maximizing production of the biofuel.

* * * * *